UNITED STATES PATENT OFFICE.

ALEXANDER S. RAMAGE, OF BUFFALO, NEW YORK, ASSIGNOR TO INTERNATIONAL COLOR & CHEMICAL CO., INC., OF BUFFALO, NEW YORK, A CORPORATION OF NEW YORK.

METHOD OF MAKING PAINTS, ENAMELS, AND THE LIKE.

1,084,361.     Specification of Letters Patent.     Patented Jan. 13, 1914.

No Drawing.     Application filed February 1, 1913. Serial No. 745,722.

*To all whom it may concern:*

Be it known that I, ALEXANDER S. RAMAGE, a citizen of the United States, residing at Buffalo, in the county of Erie and State of New York, have invented certain new and useful Improvements in Methods of Making Paints, Enamels, and the like, of which the following is a specification.

This invention relates to the manufacture of paints, enamels, and like compositions; and has for its object to provide a method whereby such compositions may be prepared from suitable pigments in a single operation without the expensive steps of washing and drying the pigment, grinding and bolting, and the subsequent process of oil-mixing and grinding the paint.

In my prior Patent No. 1,004,078, I have described a method of making paints or like compositions, according to which a precipitated pigment is incorporated with relatively large proportions, approximating 30 per cent., of certain insoluble metallic soaps, the latter being incorporated with the pigment and vehicle while rendered fluid by heat. Paints thus prepared necessarily contain a small percentage of pigment, inasmuch as the metallic soap is present in large excess of the amount which can be dissolved by the paint vehicle, and the undissolved excess of soap displaces a corresponding quantity of the pigment.

According to my Patent 1,008.434, comparatively large proportions of metallic soaps (5 to 30 per cent.) are compounded with pigments in presence of water, and the bulk of the water thereafter displaced by mixing with oil at normal or atmospheric temperatures. Paints thus prepared contain metallic soaps in excess of the quantity soluble in oil, and are hence for certain purposes deficient in pigment; they contain moreover a small percentage of residual water which renders them unfit for some purposes.

If it be attempted to prepare a paint containing such small percentages of lead stearate or other suitable metallic soap that the soap may enter completely into solution in the oil and so remain throughout the entire range of climatic temperature variations, it is found that the methods detailed in the above patents are inapplicable for the reason that such small proportions cannot be uniformly incorporated in melted condition with the pigment, and do not suffice to effect a separation of water from the pigment when agitated with oil under ordinary conditions.

The object of the present invention is to produce a paint or like product containing a larger percentage of pigment than can be incorporated in accordance with the prior methods, said paint being substantially dehydrated, and possessing the advantageous qualities due to the presence of the lead stearate or other metallic soap. The method will be described by reference to certain specific embodiments thereof, it being understood that the invention is not thereby limited. The method is particularly applicable in practice to the preparation of paints from chrome yellows, greens, blues, Para reds, oxids of iron and the like.

According to the preferred mode of practising the invention the pigment, suspended in or mixed with water, is intimately mixed with a suitable soap, usually a tallow or olein soap, which has been dissolved in water. A suitable proportion of soap is about one per cent. to five per cent. by weight of the pigment, it being borne in mind that the object is to produce a paint containing the same amount of color or pigment as the present paints. The more soap used above two per cent. decreases the amount of pigment in the paint. If the pigment does not contain any basic lead compound, the dissolved excess of the soap is precipitated by means of a lead solution, or other suitable metallic salt yielding an insoluble metallic soap, or it can be treated with acid, thereby liberating the fatty acid over the pigment. The pigment settles very readily and can be washed at once by decantation. The supernatant liquor is then run off, and the pulp placed in a steam jacketed mixer and heated to 140° F. or above, but below the melting-point of the soap, and the requisite amount of the vehicle added. On mixing, the water at once separates out and is run off leaving a stiff paste containing only about two per cent. of water. The paste is then heated while it is being stirred until that water is driven off, and it is then thinned as required with more vehicle. Even the most delicate greens and yellows are unaffected by this method and, as the color has never become dry, there is no dust, and all the different colors can be produced side by side. The paints so made will contain the same proportion of color to oil as at present, as the small amount of metallic stearate or oleate dissolves in the oil, thereby improving its wearing capabilities and doing away with the need of driers, since the paint so made dries very rapidly, and with a great gloss.

As one specific example of the invention, I will describe the preparation of a lemon chrome. One hundred pounds lead acetate are dissolved in water, and a solution containing ten pounds sulfuric acid, and twenty-two pounds bichromate of potash added. The lemon chrome is at once precipitated, and the supernatant liquor contains an excess of lead acetate and some free acetic acid. A solution of two pounds tallow or lard oil soap is then added while stirring, and the color allowed to settle. The curdy precipitate is run off onto cheese cloth, and washed with water. The wet mass is then placed in a steam jacketed mixer and heated to or above 140° F., two gallons linseed oil added, and the whole well mixed. Immediately the water separates and is run off, leaving a stiff paste in oil in the mixer. The precise temperature employed at this stage depends chiefly or entirely upon the proportion of metallic soap present, the temperature being in general higher as the ratio of soap to pigment is less. In any case, the temperature is raised until a sharp separation of water occurs, the original emulsion being destroyed and a stiff homogeneous paste formed. The heat is then raised to about 212° F., and the paste well mixed for about fifteen minutes. The remaining water is thus driven off and the now dehydrated paste can then be thinned as required. In the case of japans or enamels, the mixer preferably has a condenser attached, and the volatile solvent used is condensed, and, after the settling out of the water from the solvent, is returned to the paste in the mixer, when thinning. The products so obtained are in an extremely fine state of subdivision, being very much finer than can be obtained by grinding. In fact so finely divided are the colors produced in this way that when they are extracted with ether, it is impossible to filter them, as the pigment passes through any ordinary filter paper. In the case of basic lead compounds, the lead hydrate combines with the soap, but in all other cases it is necessary to add a precipitating salt of lead. In the case of greens, Prussian blues, and light yellow chromes, it is preferred to add the precipitating salt before the soap solution, for fear of free alkali in the soap, which would injure the color.

In the case of diluted colors, such as the cheaper greens, reds, etc., the diluent, such as barytes, or whiting, is added as usual in the manufacture of color, and the amount of soap calculated on the total weight of the pigment. In the case of iron oxids made by roasting copperas, it is sufficient to grind the pigment as obtained from the furnaces in water and add the soap, since such pigments always contain undecomposed ferric sulfate which acts as the precipitant for the soap. The films produced from the paints prepared as hereinabove described are much more lasting than those made with pure linseed oil, as the presence of the stearate or oleate gives the film a water-repellent action and the rain does not wet it, as it acts as if coated with tallow. The paint dries vary rapidly even when made with raw linseed oil, and entirely does away with driers and the resultant disintegration caused by them.

While the stearate paints, enamels, etc., obtained by the above process are superior to ordinary paints, enamels, etc., for many purposes, I find it advantageous to use oleates in the manufacture of color varnishes and enamels; I use olein soap, oleate of lead, or even oleic acid, in the place of tallow soap, stearate of lead, etc., as above described.

I claim:

1. The method of making paints or the like, which consists in compounding a pigment with a metallic soap in presence of water, the soap being in less proportion than 5 per cent. by weight of the pigment, adding a suitable paint vehicle to the moist product, raising the temperature of the mass sufficiently to cause separation of water, and removing the water thus separated.

2. The method of making paints or the like, which consists in compounding a pigment with a metallic soap in presence of water, the soap being in less proportion than 5 per cent. by weight of the pigment, adding a suitable paint vehicle to the moist product, raising the temperature of the mass sufficiently to cause separation of water, removing the water thus separated, and continuing the heating to dehydrate the residual paste.

3. The method of making paints or the like, which consists in compounding a pigment with a stearate soap in presence of water, the soap being in less proportion than 5 per cent. by weight of the pigment, adding a suitable paint vehicle to the moist product, raising the temperature of the mass sufficiently to cause separation of water, and removing water thus separated.

4. The method of making paints or the like, which consists in compounding a pigment with a stearate soap in presence of water, the soap being in less proportion than 5 per cent. by weight of the pigment, adding a suitable paint vehicle to the moist product, raising the temperature of the mass sufficiently to cause separation of water, removing water thus separated, and continuing the heating to dehydrate the residual paste.

5. The method of making paints, which consists in compounding a pigment, a water-soluble soap, being less than five per cent. of the weight of the pigment, and a precipitant for said soap, in the presence of water, then heating the resultant mass, and displacing the water by means of a suitable paint vehicle.

6. The method of making paints, which consists in compounding a pigment, a water-soluble soap, being less than five per cent. of the weight of the pigment, and a precipitant for said soap, then displacing water from the resultant mass by means of a suitable paint vehicle, and then heating the paste to drive off the remaining water.

7. A substantially water-free paint, comprising a precipitated pigment, an insoluble fatty-acid soap, and a paint vehicle, the soap being in less proportion than 5 per cent. by weight of the pigment, and not in material excess of the proportion soluble in said vehicle at ordinary temperatures.

8. A substantially water-free paint, comprising a precipitated pigment, an insoluble stearate soap, and a paint vehicle, the soap being in less proportion than 5 per cent. by weight of the pigment, and not in material excess of the proportion soluble in said vehicle at ordinary temperatures.

In testimony whereof I affix my signature in presence of two witnesses.

ALEXANDER S. RAMAGE.

Witnesses:
 CHARLES F. HOUCK,
 RUBY RAMAGE.